June 4, 1935.  A. K. SORENSEN  2,003,840
LUBRICANT SEALED SEAT
Filed March 29, 1932
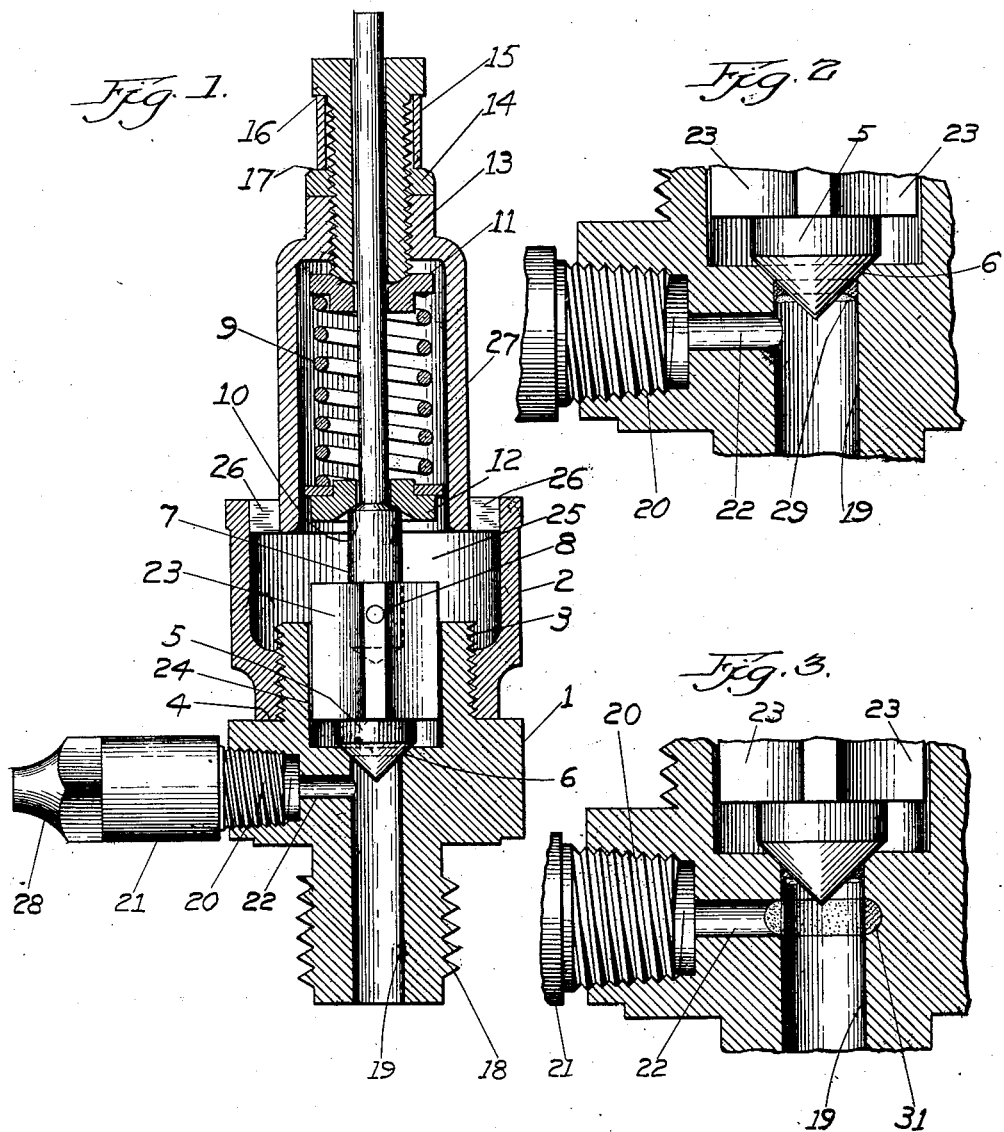
Witness:
R. B. Davison.
Inventor:
Alfred K. Sorensen
By: Joseph O. Lange
Attys Patented June 4, 1935

2,003,840

UNITED STATES PATENT OFFICE 2,003,840

LUBRICANT SEALED SEAT

Alfred K. Sorensen, Chicago, Ill., assignor to Crane Co., Chicago, Ill., a corporation of Illinois Application March 29, 1932, Serial No. 601,815

2 Claims. (Cl. 137—53)

This invention pertains to a valve device and more particularly, for purposes of illustration, refers to a pressure actuated valve in which the seat tightness is accomplished by means of a fluid seal directed to the pressure side or inlet of the seat bearing, in which the line pressure itself is used to effect a tight seat.

Previously, numerous manually actuated valves as distinguished from pressure actuated valves have had their seat tightness improved by providing a lubricant seal at the seat bearing. In this connection, for example, it seems desirable to make reference to the following patents indicative of the past art:—German Patent No. 152,869, dated February 24, 1903, German Patent No. 508,737, dated April 21, 1929, and French Patent No. 681,848, dated September 14, 1929.

In these prior patents the lubricant was directed mechanically by means of channels to the seat bearing surfaces. Pressure from the lubricant supply means was relied upon to affect a tight seal between the abutting seating surfaces, in addition to the increased compression placed upon the seat contact itself obtained by a screw or stem to which the disc or valve closure member was connected.

By this invention, however, it is apparent that a simple and economical method of utilizing the pressure in the line itself is used to make a tight seat, and at the same time dispense with the more expensive and often complicated channel directing lubricant means of the prior art as exemplified in the previously mentioned patents.

Reference to the drawing and the description follows, which will explain more clearly the objects and advantages of this invention.

Fig. 1 is a sectional assembly view of a pressure relief valve showing a preferred application of my invention.

Fig. 2 is an enlarged view showing how the seal for the seat is accomplished.

Fig. 3 is a similarly enlarged view showing one of the many modifications possible in obtaining the sealing means, and particularly detailing a retaining groove or positioning means for the lubricant, in order to allow for the line pressure within the inlet passage to act upon the said lubricant which is preferably positioned in proximity to the seat bearing.

Similar reference characters refer to similar parts in the several views.

Referring to Fig. 1, the casing 1 of the valve is connected to a bonnet 2 by means of the screw threads 3 with a shoulder 4 abutting the bonnet in order to make a tight joint. The valve closure member 5 seats in the casing 1 upon the seating surface 6 and is guided by means of the stem 7 which is fixedly connected thereto by means of the pin 8. The valve closure member 5 is held to its seat by means of the spring 9 which is maintained in compression by means of the upper and lower spring washers 11 and 12 respectively. Adjustability of the compression on the spring is obtained by means of the adjusting screw 13 which is located in the bonnet member in an established setting by means of the locknut 14. The amount of compression under which the spring is placed is conveniently determined by means of the clearance filler member 15 which controls the space between the underside of the shoulder 16 of the adjusting screw and the upper side 17 of the locknut.

The spring is adjusted to release the disc for what is commonly termed the pop or relieving pressure. The valve casing 1 by means of the threads 18 is connected to the boiler or other vessel (not shown) which it is desired to relieve by means of the port 19.

The conventional lubricant connector 21, which may either be an Alemite fitting, an oil feed, or any other method of forced or directed lubrication in order to insert the lubricant through the port 22 into the casing inlet 19 at a location relatively proximate to the valve seating surface 6, is connected to the casing 1 by means of the threads 20.

It is apparent that it will also be possible to seal the valve seat by simply inverting the valve and thus permitting the sealing medium to move by gravity to the seat bearing contact, and thus any opening from the outside to the valve inlet permitting the insertion of the sealing medium will be satisfactory.

In operation, let it be supposed that the valve is set for fifty pounds pressure. The spring 9 is so adjusted that when the pressure builds up beneath the seat to this extent the spring will compress because of the force of the pressure upon the valve closure member 5. Immediately the released fluid or gas rushes past the channeled orifices 23 of the disc guide 24 up into the chamber 25 and out into the atmosphere through the multiple ports 26 circumventing the spring cover 27. Just as soon as the pressure in the vessel or boiler is relieved sufficiently, the valve closure member under the compression of the spring 9 returns to its seat 6. This describes briefly an action common to this type of valve which may take place many times during the course of a day or, contrarily, may occur infrequently depending upon the service to which the pressure vessel itself is subjected.

It is universally agreed that when a spring loaded valve is used on such services as air, gasoline, or other volatile liquids or gases, leakage will very likely occur regardless of how high a degree of workmanship is used to make the seat bearing contact. It has been determined conclusively that tool marks, for example, however slight, constitute imperfections on the seat sufficient to cause a leak, and even grinding or lapping the disc closure member by means of fine abrasives does not remove these imperfections.

If the gas under pressure within the valve is of an explosive nature, such as hydrogen or oxyacetylene gas, it is quite apparent that even a slight leak would be very dangerous to life and property. In addition, such leaks are treacherous because they are usually imperceptible to the observer and probably only visibly evidenced by submerging the valve in water, and then noting that tiny air bubbles rise to the surface of the water. The latter method is a recognized way of testing valves intended for air service.

However, it has been found that by supplying a sealing medium as previously mentioned, such as oil, grease, soap water or even water alone to the pressure side of the seat bearing and then allow the escaping fluid to act behind the sealing medium, the leak is literally plugged. This is true because the escaping gas or fluid forces the sealing medium to fill in the slightest imperfections of the seat bearing contact to form a leak proof seal.

A manually operated valve, that is, one using a threaded stem, is of course equally susceptible of the sealing means described herein.

By means of this invention, this objectionable condition is overcome by applying a lubricator gun (not shown) to the tip 28 of the lubricator fitting and giving a turn or two to the handle of the gun, thus forcing the sealing medium confined therein past the ball check valve (not shown) of the lubricator connection 21 through the port 22 and into the inlet 19 adjacent the seat 6. The pressure ordinarily exerted by the gun is sufficient to project the sealing medium across the port opening 19.

By referring to Fig. 2, it will be more clearly understood as to what action the lubricant takes upon entering the inlet 19. The escaping fluid or gas in the inlet 19 having an upward movement toward the seat 6 forces the lubricant 29 into the crevice formed by the angularity of the disc closure member 5. The lubricant being of heavier viscosity than the escaping fluid in the vessel, serves as a barrier or dam in preventing the further escape of the fluid or gas past the bearing surface between the disc 5 and the seat 6 as illustrated.

There may be instances in which there must be provision for holding the grease within the port 19 so as to keep it from travelling down the walls of the inlet and thence into the pressure vessel. Therefore, in communication with the port 22 as shown in Fig. 3 it has sometimes been found desirable to provide an annular groove 31 which satisfactorily contains the lubricant, and prevents its running down the walls of the inlet port and at the same time keeps it in reserve for use in the event that leakage at the seat develops.

It is obvious that, depending upon the size of the valve, it may be desirable to project the grease into the inlet from a number of angles thus requiring, for example, two or three lubricator connections instead of the single one illustrated. It should also be apparent that the method or means of providing a lubricant sealing means using pressure for obtaining tightness is capable of many varied modifications, and I therefore desire to be limited only by the scope of the appended claims.

I claim:

1. In a valve comprising a casing, an inlet passage in said casing, a valve seat at the upper end of said passage, a substantially lateral port extending through the wall of the said casing and opening into the said passage in proximity to the said valve seat, a valve closure member to normally engage said seat, a seal in said passage at the juncture of the said closure member and the wall of the said passage, means positioned exteriorly of the said casing for conducting a sealing medium through said port and into the said passage, the said sealing medium being forced into contact with the said closure member and the wall of the said passage to form the said seal by the pressure of a fluid in said inlet passage.

2. In a valve comprising a casing, an inlet passage in the said casing, a valve seat at the upper end of the said passage, a substantially lateral port extending through the wall of the said casing and opening into the said passage adjacent the said valve seat, a valve closure member to normally engage said seat, a seal in said passage at the juncture of the said closure member and the wall of the said passage, means positioned exteriorly of the said casing for conducting a sealing medium through the said port and into the said passage, an annular groove surrounding the passage and in communication with the lateral port for receiving the sealing medium, the said sealing medium being forced into contact with the said closure member and the wall of the said passage to form the said seal by the pressure of a fluid in the said inlet passage.

ALFRED K. SORENSEN.